(12) United States Patent
Du et al.

(10) Patent No.: US 9,461,995 B2
(45) Date of Patent: Oct. 4, 2016

(54) TERMINAL, NETWORK LOCKING AND NETWORK UNLOCKING METHOD FOR SAME, AND STORAGE MEDIUM

(71) Applicant: ZTE Corporation, Shenzhen (CN)

(72) Inventors: Xinghai Du, Shenzhen (CN); Jing Liang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/025,149

(22) PCT Filed: May 13, 2014

(86) PCT No.: PCT/CN2014/077344
§ 371 (c)(1),
(2) Date: Mar. 25, 2016

(87) PCT Pub. No.: WO2014/177076
PCT Pub. Date: Nov. 6, 2014

(65) Prior Publication Data
US 2016/0227413 A1    Aug. 4, 2016

(30) Foreign Application Priority Data

Sep. 27, 2013  (CN) .......................... 2013 1 0452269

(51) Int. Cl.
*H04L 29/06*    (2006.01)
*H04W 12/08*    (2009.01)
(Continued)

(52) U.S. Cl.
CPC ......... *H04L 63/0876* (2013.01); *H04L 9/3226* (2013.01); *H04M 1/67* (2013.01); *H04W 12/06* (2013.01); *H04W 12/08* (2013.01)

(58) Field of Classification Search
CPC .................................................. H04L 63/0876
See application file for complete search history.

(56) References Cited

U.S. PATENT DOCUMENTS 6,321,079 B1 * 11/2001 Cooper ................ H04W 8/183
455/410
8,326,264 B2 * 12/2012 Miyajima ............. H04W 8/245
370/310.2

(Continued)

FOREIGN PATENT DOCUMENTS

| CN | 101605326 A | 12/2009 |
|----|-------------|---------|
| CN | 102170630 A | 8/2011  |
| CN | 102301381 A | 12/2011 |

OTHER PUBLICATIONS

Katzela et al; Channel assignment schemes for cellular mobile telecommunication systems: a comprehensive survey; Published in: IEEE Personal Communications (vol. 3 , Issue: 3 ); pp. 10-31; Date of Publication : Jun. 1996; IEEE Xplore.*

(Continued)

*Primary Examiner* — Bradley Holder
(74) *Attorney, Agent, or Firm* — Oppedahl Patent Law Firm LLC (57) ABSTRACT

The present invention discloses a terminal, a network locking and network unlocking method for same, and a storage medium, said network locking method comprising: writing network-locking parameters in a first memory unit of the terminal; obtaining, in accordance with terminal hardware unique identification information and the network-locking parameters, network-locking parameter authentication information and an unlock code; storing the obtained network-locking parameter authentication information in a second memory unit of the terminal, and saving the unlock code.

14 Claims, 8 Drawing Sheets

(51) Int. Cl.
*H04W 12/06* (2009.01)
*H04M 1/67* (2006.01)
*H04L 9/32* (2006.01)

(56) References Cited

U.S. PATENT DOCUMENTS

| | | | | |
|---|---|---|---|---|
| 8,442,194 B2* | 5/2013 | Ahn | ................ | H04M 3/38 |
| | | | | 379/201.01 |
| 8,661,133 B2* | 2/2014 | Park | ................ | H04L 63/0227 |
| | | | | 709/225 |
| 8,903,361 B2* | 12/2014 | Weng | ................ | H04W 12/12 |
| | | | | 455/410 |
| 8,923,917 B2* | 12/2014 | Feng | ................ | H04W 12/08 |
| | | | | 455/432.1 |
| 2008/0070590 A1* | 3/2008 | Miyajima | ............. | H04W 8/245 |
| | | | | 455/456.3 |
| 2010/0008487 A1* | 1/2010 | Ahn | ................ | H04M 3/38 |
| | | | | 379/201.01 |
| 2011/0185060 A1* | 7/2011 | Park | ................ | H04L 63/0227 |
| | | | | 709/224 |
| 2011/0271101 A1* | 11/2011 | Liu | ................ | H04W 12/08 |
| | | | | 713/156 |
| 2012/0057701 A1* | 3/2012 | Sun | ................ | H04W 8/183 |
| | | | | 380/247 |
| 2012/0220269 A1* | 8/2012 | Feng | ................ | H04W 12/08 |
| | | | | 455/411 |
| 2013/0090091 A1* | 4/2013 | Weng | ................ | H04W 12/06 |
| | | | | 455/411 |

OTHER PUBLICATIONS

Patel et al.; Ticket based service access for the mobile user; Proceeding MobiCom '97 Proceedings of the 3rd annual ACM/IEEE international conference on Mobile computing and networking; pp. 223-233; 1997; ACM Digital Library.*

International Search Report in international application No. PCT/CN2014/077344, mailed on Sep. 3, 2014.

English Translation of the Written Opinion of the International Search Authority in international application No. PCT/CN2014/077344, mailed on Sep. 3, 2014.

* cited by examiner

TERMINAL, NETWORK LOCKING AND NETWORK UNLOCKING METHOD FOR SAME, AND STORAGE MEDIUM

TECHNICAL FIELD

The disclosure relates to the field of communication, and in particular to a terminal, network locking and network unlocking methods thereof, and a storage medium.

BACKGROUND

Along with rapid popularization of mobile networks on a global scale, in particular rapid growth of 3-Generation (3G) networks, each operator attracts users in manners of communication fee subsidy or mobile terminal bundling in terms of selling modes of mobile terminals such as mobile phones, tablets and data cards to increase and consolidate the number of users. In order to prevent user loss and reward early subsidy investment of operators, the operators usually protect own customer resources and expect their own customers to use their own specified network resources only by network locking. In a prior art, a network locking on a mobile terminal is implemented by limiting the mobile terminal to use only a specified data card such as a Subscriber Identity Module (SIM) card. An existing network locking solution mainly includes the following steps:

Step 1, when producing a terminal, a mobile terminal manufacturer writes a legal Public Land Mobile Network (PLMN) number segment, a locking identifier and an unlocking code value into a flash of the terminal;

Step 2, when a terminal user inserts a card into the terminal, the terminal reads a PLMN number segment from the SIM card or acquires the PLMN number segment from a network where the SIM card gets successfully registered, and then compares the read or acquired PLMN number segment with the preset PLMN number segment of the terminal, all functions of the terminal are enabled if they are consistent, and if they are inconsistent, all the functions of the terminal are disabled; and Step 3, when the terminal user sends an unlocking code to the terminal, the terminal compares the sent unlocking code with a preset unlocking code of the terminal by virtue of a certain algorithm and the like, clears a network locking identifier if they are consistent, and determines that unlocking fails if they are inconsistent.

In the existing network locking solution, the unlocking code value is directly obtained merely according to a set network locking parameter, and is easy to be tampered and cracked illegally, which may make the terminal easy to be unlocked illegally and lower security of network locking of the terminal.

SUMMARY

In order to solve the problem of the prior art, the embodiment of the disclosure provides a terminal, network locking and network unlocking methods thereof, and a storage medium, which may solve the problems of easily illegal unlocking and poor security of network locking of an existing terminal.

In order to solve the technical problem, the embodiment of the disclosure provides a network locking method for a terminal, which may include that:

a network locking parameter is written into a first storage unit of the terminal;

network locking parameter verification information and an unlocking code are obtained according to unique identification information of hardware of the terminal and the network locking parameter; and the obtained network locking parameter verification information is stored into a second storage unit of the terminal, and the unlocking code is stored.

In an embodiment of the disclosure, the step that the network locking parameter verification information is obtained according to the unique identification information of the hardware of the terminal and the network locking parameter may include that:

a first digest value for the unique identification information of the hardware of the terminal and the network locking parameter is calculated; and the first digest value is encrypted using a private key in a preset asymmetric encryption key pair to obtain first network locking parameter verification information.

In an embodiment of the disclosure, the step that the network locking parameter verification information is obtained according to the unique identification information of the hardware of the terminal and the network locking parameter may further include that:

a second digest value for the unique identification information of the hardware of the terminal and a public key in the asymmetric encryption key pair is calculated; and the second digest value is encrypted using the private key in the asymmetric encryption key pair to obtain second network locking parameter verification information.

In an embodiment of the disclosure, the unique identification information of the hardware of the terminal may be unique identification information, which can be acquired only through an internal program of the terminal, of the hardware.

In an embodiment of the disclosure, the unique identification information of the hardware of the terminal may be unique identification information of a baseband chip of the terminal.

In order to solve the problem, the embodiment of the disclosure also provides a network unlocking method for a terminal, which may include that:

a first unlocking code input by a user is received;

a local unlocking code of the terminal is calculated according to a network locking parameter stored in the terminal and unique identification information, adopted for network locking, of hardware of the terminal; and comparison is performed to determine whether the first unlocking code is consistent with the local unlocking code, and if YES, it is determined that network unlocking succeeds.

In an embodiment of the disclosure, the method may further include: before the step that comparison is performed to determine whether the first unlocking code is consistent with the local unlocking code, the first unlocking code and a first unlocking code ciphertext are received, wherein the first unlocking code ciphertext is a ciphertext obtained by encrypting the first unlocking code input by the user using a private key in an asymmetric encryption key pair adopted for network locking of the terminal;

the first unlocking code ciphertext is unlocked according to a public key in the asymmetric encryption key pair adopted for the network locking of the terminal to obtain a first check unlocking code; and comparison is performed to determine whether the first unlocking code is consistent with the first check unlocking code, and if YES, comparison is performed to determine whether the first unlocking code is consistent with the local unlocking code.

In an embodiment of the disclosure, the method may further include: before the step that the first unlocking code input by the user is received and when the terminal is started, integrity check is performed on the network locking parameter stored in a first storage unit of the terminal; or integrity check is performed on the public key in the asymmetric encryption key pair adopted for the network locking of the terminal.

In an embodiment of the disclosure, the step that integrity check is performed on the network locking parameter stored in the first storage unit of the terminal may include:

first network locking parameter verification information stored during the network locking is read from a second storage unit of the terminal, decryption processing is performed on the first network locking parameter verification information according to the public key in the asymmetric encryption key pair adopted for the network locking of the terminal to obtain a first check digest value, and a check network locking parameter is acquired from the first check digest value; and the check network locking parameter and the network locking parameter stored in the first storage unit are compared to determine whether the two parameters are consistent, and if YES, it is determined that the network locking parameter is complete;

the step that integrity check is performed on the public key in the asymmetric encryption key pair adopted for the network locking of the terminal may include:

second network locking parameter verification information stored during the network locking is read from the second storage unit of the terminal, decryption processing is performed on the second network locking parameter verification information according to the public key in the asymmetric encryption key pair adopted for the network locking of the terminal to obtain a second check digest value, and a check public key is acquired from the second check digest value; and the check public key and the public key stored in the second storage unit are compared to determine whether the two keys are consistent, and if YES, it is determined that the public key is complete.

In an embodiment of the disclosure, the method may further include that: after network unlocking of the terminal is successfully performed, the network locking parameter stored in a first storage unit of the terminal is updated into an unlocking parameter;

a third digest value for the unique identification information of the hardware of the terminal and the unlocking parameter is calculated; and the third digest value is encrypted using the private key in the asymmetric encryption key pair adopted for the network locking to obtain third network locking parameter verification information, and the third network locking parameter verification information is stored into a second storage unit of the terminal.

In an embodiment of the disclosure, the method may further include:

when the terminal is started after successful unlocking, the third network locking parameter verification information is read from the second storage unit of the terminal, decryption processing is performed on the third network locking parameter verification information according to the public key in the asymmetric encryption key pair adopted for the network locking of the terminal to obtain a third check digest value, and a check unlocking parameter is acquired from the third check digest value; and the check unlocking parameter and the unlocking parameter stored in the first storage unit are compared to determine whether the two parameters are consistent, and if YES, it is determined that the unlocking parameter is complete.

In order to solve the problem, the embodiment of the disclosure further provides a terminal including a first storage unit, a second storage unit, a sending unit, a receiving unit and a processing unit, in which:

the receiving unit may be configured to receive a network locking parameter and store the network locking parameter in the first storage unit;

the processing unit may be configured to obtain network locking parameter verification information and an unlocking code according to unique identification information of hardware of the terminal and the network locking parameter, and store the obtained network locking parameter verification information into the second storage unit of the terminal; and the sending unit may be configured to send out the unlocking code for storage.

In an embodiment of the disclosure, the second storage unit may be a One Time Programmable (OTP) storage unit.

In an embodiment of the disclosure, the operation that the processing unit obtains the network locking parameter verification information according to the unique identification information of the hardware of the terminal and the network locking parameter may include that:

a first digest value for the unique identification information of the hardware of the terminal and the network locking parameter is calculated; and the first digest value is encrypted using a private key in a preset asymmetric encryption key pair to obtain first network locking parameter verification information.

In an embodiment of the disclosure, the operation that the processing unit obtains the network locking parameter verification information according to the unique identification information of the hardware of the terminal and the network locking parameter may further include:

a second digest value for the unique identification information of the hardware of the terminal and a public key in the asymmetric encryption key pair is calculated; and the second digest value is encrypted to using the private key in the asymmetric encryption key pair obtain second network locking parameter verification information.

In an embodiment of the disclosure, the unique identification information of the hardware of the terminal may be unique identification information, which can be acquired only through an internal program of the terminal, of the hardware.

In an embodiment of the disclosure, the receiving unit may further be configured to receive a first unlocking code input by a user; and the processing unit may further be configured to calculate a local unlocking code according to the network locking parameter stored in the terminal and the unique identification information, adopted for network locking, of the hardware of the terminal, perform comparison to determine whether the first unlocking code is consistent with the local unlocking code, and if YES, determine that network unlocking succeeds.

In order to solve the problem, the embodiment of the disclosure further provides a computer storage medium having stored therein a computer-executable instruction configured to execute the abovementioned network locking method for a terminal and/or the network unlocking method for a terminal.

The embodiment of the disclosure achieves the following beneficial effects: during network locking of the terminal, the network locking parameter is written into the first storage unit of the terminal, and the network locking parameter verification information and the unlocking code are obtained on the basis of the unique identification information of the hardware of the terminal and the network locking parameter; and when network unlocking of the terminal is performed, the unlocking code is obtained according to the network locking parameter stored in the terminal and the unique identification information of the hardware of the terminal; and comparison is performed to determine whether the unlocking code is consistent with the unlocking code input by the user, and when the two codes are consistent, it is determined that network unlocking is successfully performed. It is clear that the technical solutions provided by the disclosure may implement unique binding of the network locking parameter of the terminal and the unique identification information of the hardware of the terminal, and network unlocking can be smoothly performed only according to the unique identification information of the hardware of the terminal, so that difficulty in illegal cracking of the unlocking code can be increased to a greater extent and thus security of network locking of the terminal can be improved.

BRIEF DESCRIPTION OF THE DRAWINGS

FIG. 1-1 is a flowchart of network locking of a terminal according to embodiment 1 of the disclosure;

FIG. 1-2 is a flowchart of obtaining network locking parameter verification information by adopting an asymmetric encryption algorithm according to embodiment 1 of the disclosure;

FIG. 2-1 is a flowchart of releasing network locking of a terminal according to embodiment 1 of the disclosure;

FIG. 2-2 is a flowchart of performing integrity check on a first unlocking code input by a user according to embodiment 1 of the disclosure;

DETAILED DESCRIPTION

The embodiment of the disclosure is intended to solve the problem of poor security of network locking of an existing terminal caused by easily illegal cracking of network locking of the terminal; during network locking of the terminal, an unlocking code is obtained by virtue of unique identification information of hardware of the terminal and a network locking parameter, that is, the unlocking code is uniquely bound with the hardware of the terminal during network locking, the unique identification information of the hardware of the terminal in the embodiment of the disclosure may only be obtained through an internal application program of the terminal, and the unique identification information of the hardware may not be obtained through an external program or tool, so that security of the unlocking code may further be improved, and may be prevented from being illegally cracked, and network locking of the terminal is further prevented from being illegally cracked. The technical solutions of the disclosure will be further described below with reference to specific implementation modes and the drawings in detail.

Embodiment 1

Figure 11:
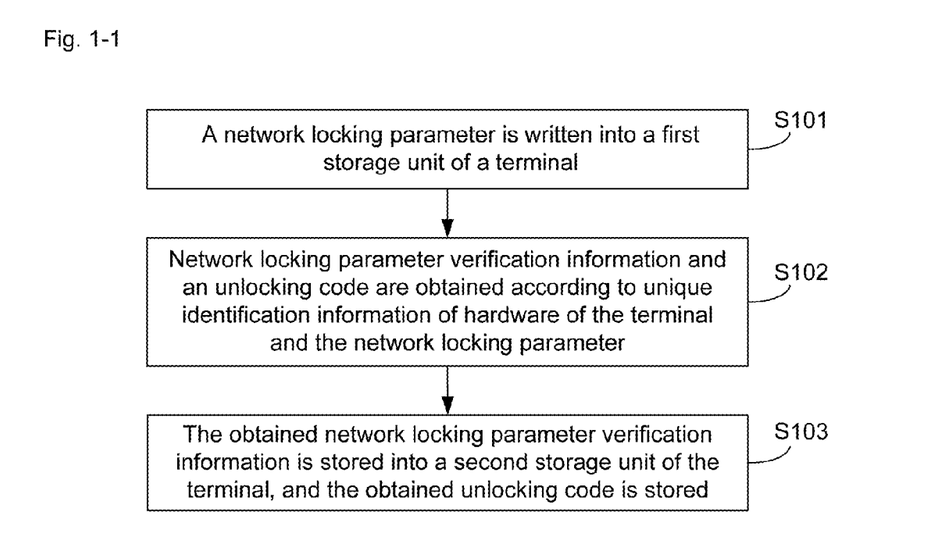

Referring to FIG. 1-1, a network locking method for a terminal provided by the embodiment includes the following steps:

Step S101, a network locking parameter is written into a first storage unit of the terminal.

The network locking parameter written in Step S101 may be a PLMN number segment, and may also be selected according to a specific application scenario.

In the embodiment, before Step S101, the method may further include: a step of determining whether the terminal supports a network locking function, and subsequent Step S101 is executed only when the terminal supports the network locking function; and an existing terminal, such as a mobile phone terminal, usually supports the network locking function.

Step S102, network locking parameter verification information and an unlocking code are obtained according to unique identification information of hardware of the terminal and the network locking parameter.

Figure 12:
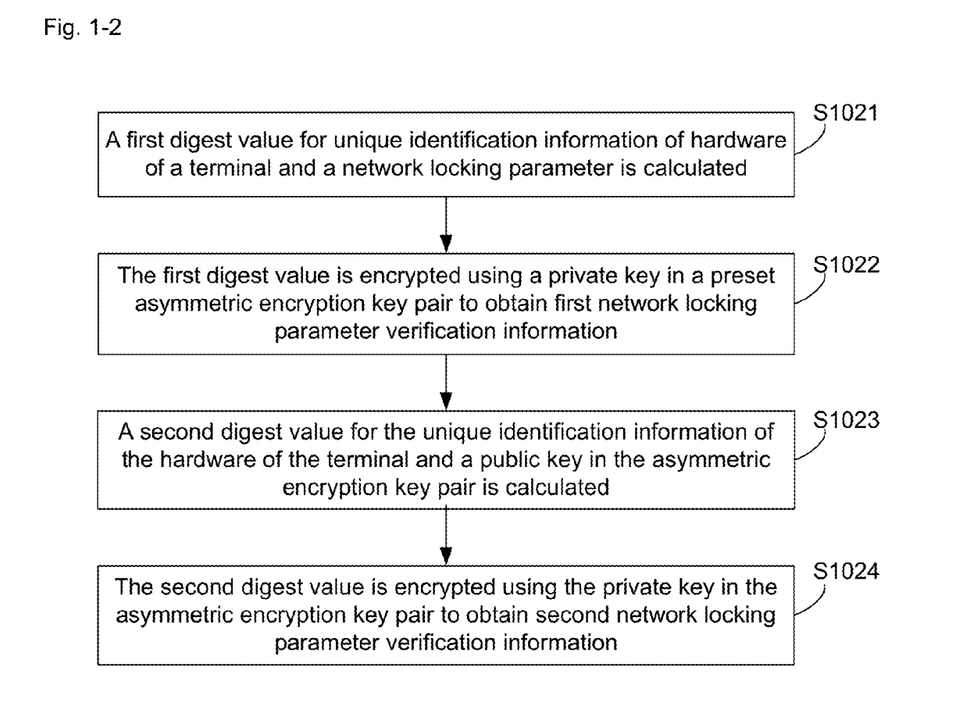

In Step S102, the network locking parameter verification information may include one or more pieces of network locking parameter verification information according to a specific encryption algorithm and a specific application scenario; for example, an asymmetric encryption algorithm such as an asymmetric Rivest-Shamir-Adleman (RSA) public key encryption algorithm may be adopted in the embodiment; then, the network locking parameter verification information in Step S102 includes first network locking parameter verification information and second network locking parameter verification information, and as shown in FIG. 1-2, the step that the network locking parameter verification information is obtained according to the unique identification information of the hardware of the terminal and the network locking parameter includes:

Step S1021, a first digest value for the unique identification information of the hardware of the terminal and the network locking parameter is calculated, wherein the digest value may be represented by a Message Digest (MD) value, and the first digest value is represented by MD1;

Step S1022, the first digest value is encrypted using a private key in a preset asymmetric encryption key pair to obtain the first network locking parameter verification information;

Step S1023, a second digest value for the unique identification information of the hardware of the terminal and a public key in the asymmetric encryption key pair is calculated; and Step S1024, the second digest value is encrypted using the private key in the asymmetric encryption key pair to obtain the second network locking parameter verification information.

It should be understood that the network locking parameter verification information may not include the second network locking parameter verification information obtained by Step S1023 and Step S1024 when the adopted encryption algorithm does not include the public key; the asymmetric encryption algorithm in the embodiment may specifically be provided by a Universal Serial Bus (USB) key, and the private key in the asymmetric encryption key pair may be stored in the USB key, so that security of network locking is further improved; and in the embodiment, the unlocking code may specifically be calculated according to keyword information of the network locking parameter and the unique identification information of the hardware of the terminal, and a specific algorithm may adopt the asymmetric RSA algorithm.

In the embodiment, the unique identification information of the hardware of the terminal may be unique identification information, which may only be obtained through an internal application program of the terminal and may not be obtained by an external program or tool, so that security of the unlocking code is further improved. For example, the unique identification information may be unique identification information of a baseband chip of the terminal, and may specifically be a unique hardware key of the baseband chip; and of course, the unique identification information of the hardware of the terminal may also be information, which may be obtained through the external application program or tool, with lower security, and for example, may be an International Mobile Equipment Identity (IMEI) of the terminal.

Step S103, the obtained network locking parameter verification information is stored into a second storage unit of the terminal, and the obtained unlocking code is stored.

In Step S103, the obtained unlocking code may be stored in the terminal; and however, for improving security, the obtained unlocking code is preferably sent to a Personal Computer (PC) side to be stored with identification information of the terminal, such as the IMEI of the terminal, as an index in the embodiment, which may specifically be implemented by establishing a mapping table of identification information of a terminal and its unlocking code.

The first storage unit and second storage unit in the embodiment may adopt the same storage unit, and may also adopt different storage units. In order to further improve security, the first storage unit is preferably a Random-Access Memory (RAM) storage unit of the terminal, and for example, may be a Non-Volatile Random Access Memory (NVRAM); the second storage unit may be a One Time Programmable (OTP) storage unit, and a written content may not be modified once the content is written into the OTP storage unit, so that the network locking parameter verification information written into the OTP storage unit may be prevented from being illegally tampered.

Step S103 further includes the operation that the public key in the asymmetric encryption key pair adopted for network locking is also stored into the second storage unit.

Network locking of the terminal may be implemented by Step S101 to Step S103, the unlocking code is bound with the unique identification information of the hardware of the terminal in a network locking process, and network unlocking may be correctly performed only after the unique identification information of the hardware is acquired; and data cloning may also be prevented to avoid an unlocked network locking parameter being copied from terminal A to network-locked terminal B for unlocking, so that security of network locking of the terminal may further be improved, and may be prevented from being illegally cracked.

In addition, after the network locking parameter verification information and the public key in the asymmetric encryption pair key adopted for network locking are stored into the OTP storage unit in the embodiment, these data may not be illegally tampered and erased; and therefore, security of network locking may further be improved.

Moreover, the asymmetric RSA algorithm is adopted for encryption calculation in the embodiment. Different operating companies may adopt different RSA key pairs for network locking parameter signing and subsequent authentication, and the private key of the key pair may be stored into the USB key; and the operating companies and hackers may smoothly implement unlocking only with the correct unlocking code and the corresponding private key, both of the two being indispensable, so that difficulty in illegal cracking is further increased.

Figure 21:
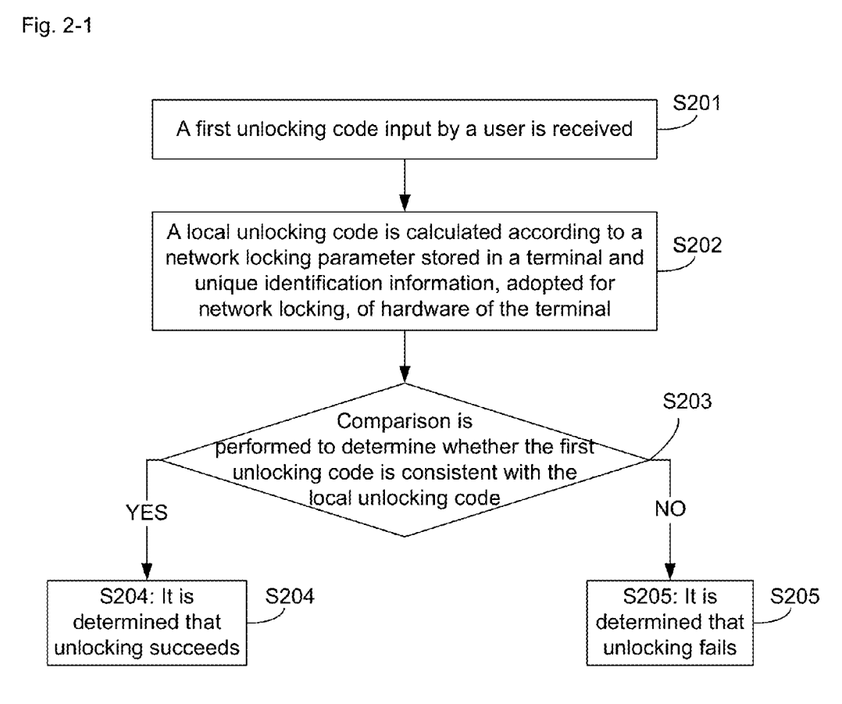

Correspondingly, a network unlocking method for a terminal provided by the embodiment, as shown in FIG. 2-1, includes the following steps:

Step S201, a first unlocking code input by a user is received;

Step S202, a local unlocking code is calculated according to a network locking parameter stored in the terminal and unique identification information, adopted for network locking, of hardware of the terminal;

Step S203, comparison is performed to determine whether the first unlocking code is consistent with the local unlocking code, Step 204 is executed if YES, otherwise Step 205 is executed;

Step S204, it is determined that unlocking succeeds; and

Step S205, it is determined that unlocking fails.

Figure 22:
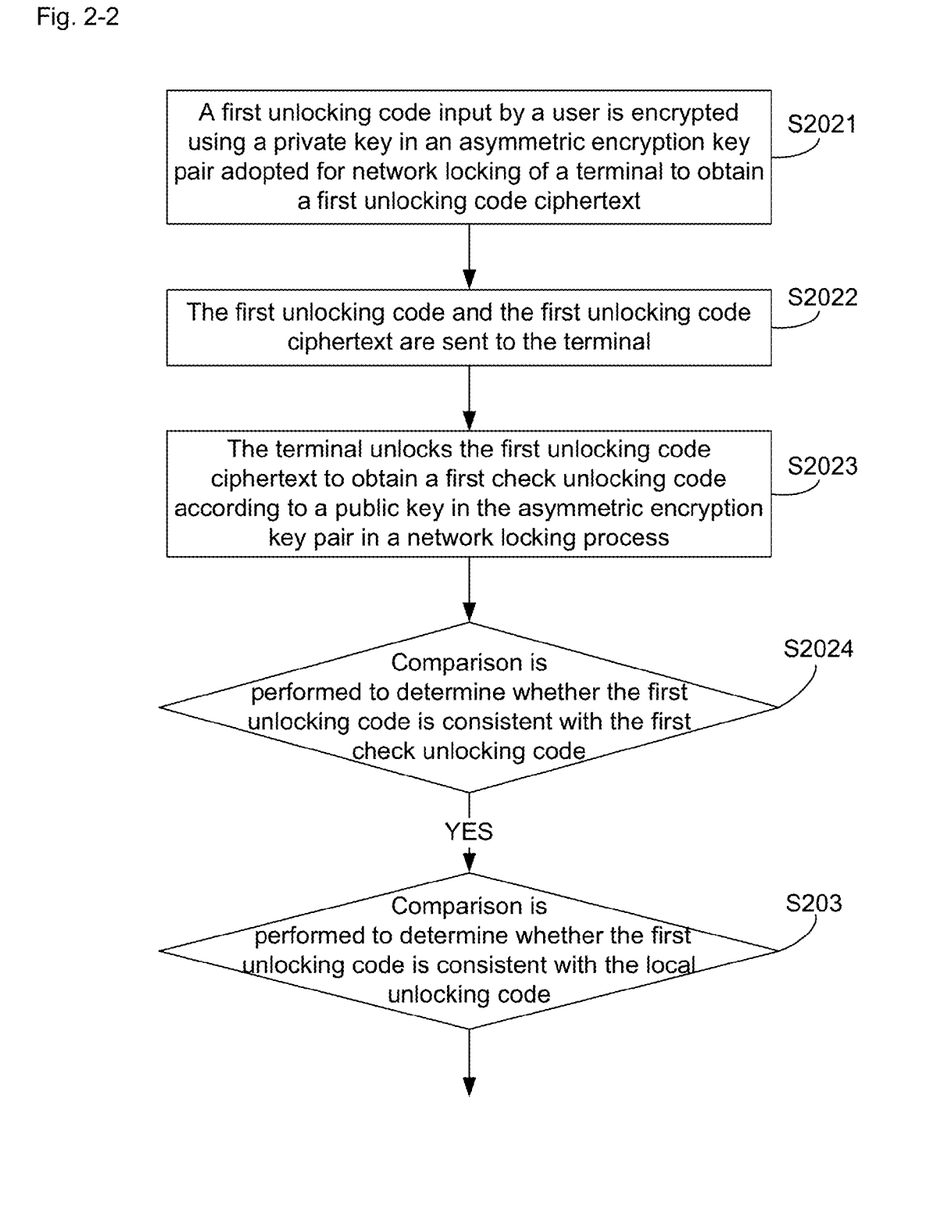

In step S201, the user may specifically input the first unlocking code through a PC side; in addition, for ensuring reliability, integrity check may also be performed on the first unlocking code input by the user in the embodiment; then, before Step S203, the method may, as shown in FIG. 2-2, further include the following steps:

Step S2021, the first unlocking code input by the user is encrypted using a private key in an asymmetric encryption key pair adopted for network locking of the terminal to obtain a first unlocking code ciphertext;

Step S2022, the first unlocking code and the first unlocking code ciphertext are sent to the terminal;

Step S2023, the terminal unlocks the first unlocking code ciphertext to obtain a first check unlocking code according to a public key in the asymmetric encryption key pair in a network locking process; and Step S2024, comparison is performed to determine whether the first unlocking code is consistent with the first check unlocking code, and if YES, Step S203 is executed.

In the embodiment, before the terminal is unlocked, that is, before Step S201 is executed, when the terminal is started, the method may further include a step that integrity check is performed on the network locking parameter in a first storage unit of the terminal;

or the method may further include a step that integrity check is performed on the public key in the asymmetric encryption key pair adopted for the network locking process of the terminal.

Figure 3:
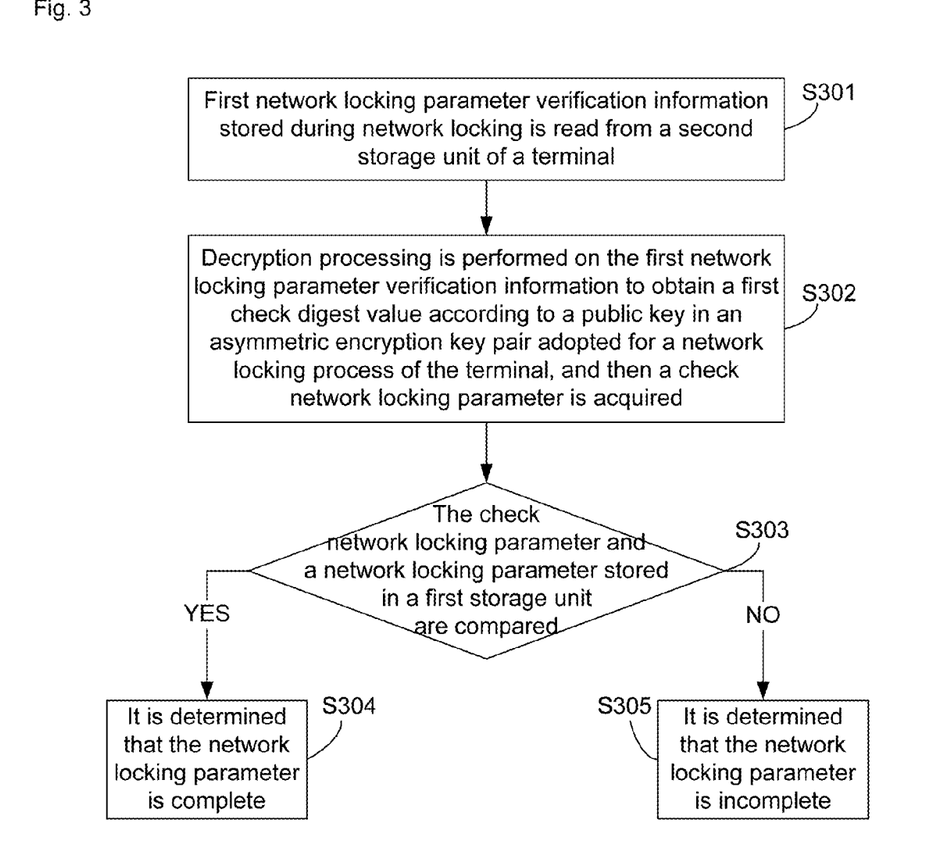
FIG. 3 is a flowchart of performing integrity check on a network locking parameter according to embodiment 1 of the disclosure.

Specifically, the step that integrity check is performed on the network locking parameter stored in the first storage unit of the terminal, as shown in FIG. 3, includes:

Step S301, first network locking parameter verification information stored during network locking is read from a second storage unit of the terminal;

Step S302, decryption processing is performed on the first network locking parameter verification information to obtain a first check digest value according to the public key in the asymmetric encryption key pair adopted for the network locking process of the terminal, and a check network locking parameter is acquired from the first check digest value;

Step S303, the check network locking parameter and the network locking parameter stored in the first storage unit are compared to determine whether the two are consistent, Step S304 is executed if YES, otherwise Step S305 is executed;

Step S304, it is determined that the network locking parameter is complete, and the terminal normally runs; and Step S305, it is determined that the network locking parameter is incomplete and may be tampered or damaged, and then the terminal may enter an offline state and disable functions such as a voice function and a network access function.

Figure 4:
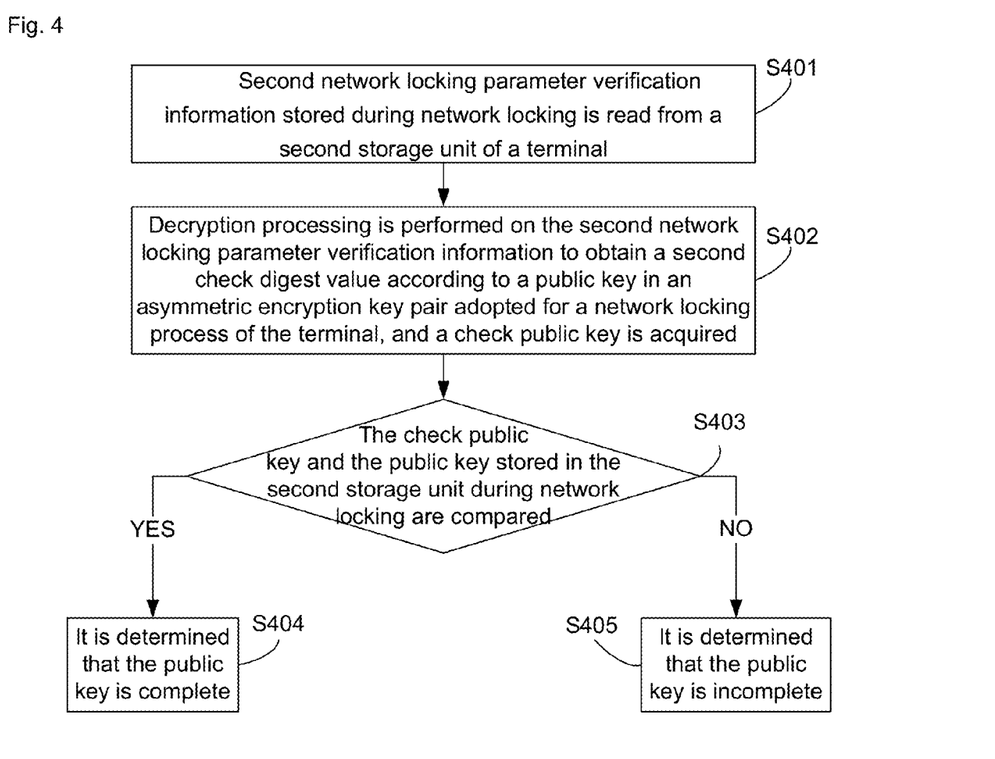
FIG. 4 is a flowchart of performing integrity check on a public key according to embodiment 1 of the disclosure.

Specifically, the step that integrity check is also performed on the public key in the asymmetric encryption key pair adopted for the network locking process of the terminal, as shown in FIG. 4, includes:

Step S401, second network locking parameter verification information stored during network locking is read from the second storage unit of the terminal;

Step S402, decryption processing is performed on the second network locking parameter verification information to obtain a second check digest value according to the public key in the asymmetric encryption key pair adopted for the network locking process of the terminal, and a check public key is acquired from the second check digest value;

Step 403, the check public key and the public key stored in the second storage unit during network locking are compared to determine whether the two are consistent, Step S404 is executed if YES, otherwise Step S405 is executed;

Step S404, it is determined that the public key is complete, that is, the terminal normally runs; and Step S405, it is determined that the public key is incomplete and namely may be tampered or damaged, and then the terminal may enter the offline state and disable the functions such as the voice function and the network access function.

Figure 5:
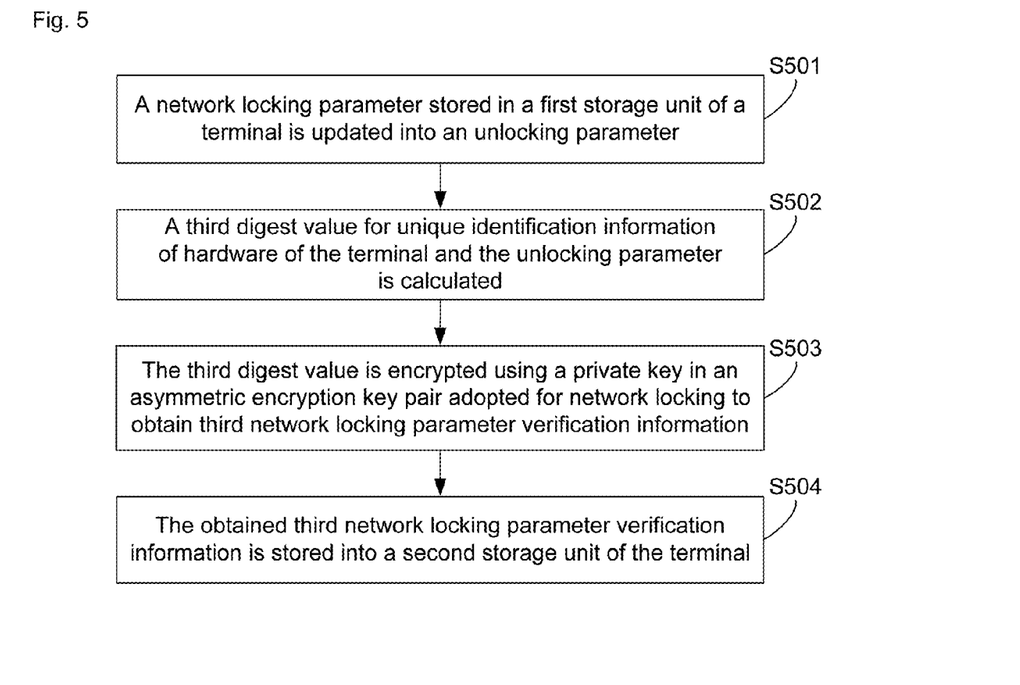
FIG. 5 is a flowchart of updating an unlocking parameter after network unlocking is successfully performed according to embodiment 1 of the disclosure.

In the embodiment, after Step S204, a step that the network locking parameter into an unlocking parameter may further be executed, and is, as shown in FIG. 5, specifically implemented as follows:

Step S501, the network locking parameter stored in the first storage unit of the terminal is updated into the unlocking parameter;

Step S502, a third digest value for the unique identification information of the hardware of the terminal and the unlocking parameter is calculated;

Step S503, the third digest value is encrypted using the private key in the asymmetric encryption key pair adopted for network locking to obtain third network locking parameter verification information; and Step S504, the obtained third network locking parameter verification information is stored into the second storage unit of the terminal.

Figure 6:
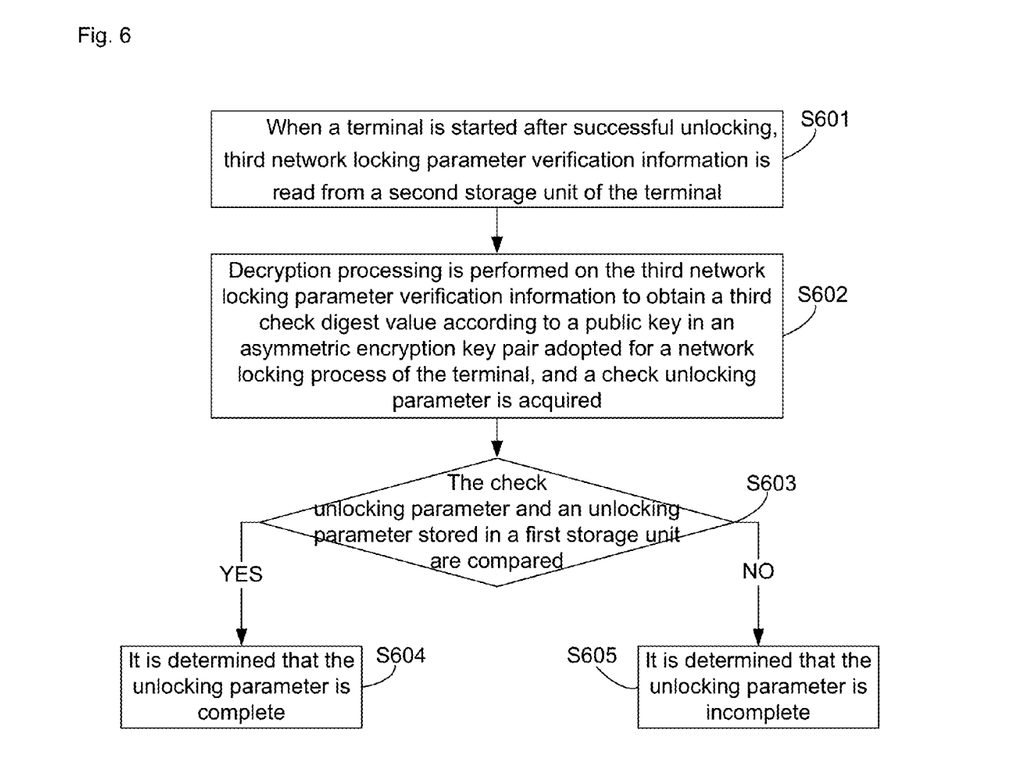
FIG. 6 is a flowchart of performing integrity check on an unlocking parameter according to embodiment 1 of the disclosure.

At this moment, network unlocking of the terminal has been successfully performed, and when the terminal is restarted, integrity detection may be performed on the third network locking parameter verification information stored in the first storage unit of the terminal, as shown in FIG. 6, specifically including the following steps:

Step S601, when the terminal is started after successful unlocking, the third network locking parameter verification information is read from the second storage unit of the terminal;

Step S602, decryption processing is performed on the third network locking parameter verification information to obtain a third check digest value according to the public key in the asymmetric encryption key pair adopted for the network locking process of the terminal, and a check unlocking parameter is acquired from the third check digest value;

Step S603, the check unlocking parameter and the unlocking parameter stored in the first storage unit are compared to determine whether the two are consistent, Step S604 is executed if YES, otherwise Step S605 is executed;

Step S604, it is determined that the unlocking parameter is complete, that is, the terminal normally runs; and Step S605, it is determined that the unlocking parameter is incomplete and namely may be tampered or damaged, then the terminal may enter the offline state and disable the functions such as the voice function and the network access function, and the current number of failed unlocking tries may further be updated to provide a basis for subsequently determining whether to perform unlocking.

Figure 7:
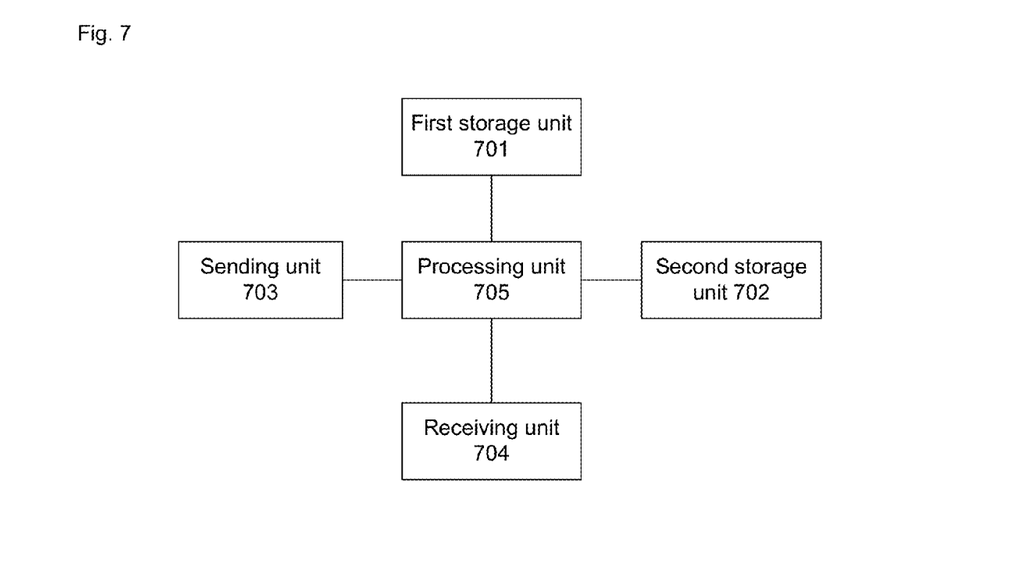
FIG. 7 is a structure diagram of a terminal according to embodiment 1 of the disclosure.

Referring to FIG. 7, the embodiment further provides a terminal, which supports a network locking function and includes a first storage unit 701, a second storage unit 702, a sending unit 703, a receiving unit 704 and a processing unit 705, wherein the receiving unit 704 is configured to receive a network locking parameter and store the network locking parameter in the first storage unit 701;

the processing unit 705 is configured to obtain network locking parameter verification information and an unlocking code according to unique identification information of hardware of the terminal and the network locking parameter, and store the obtained network locking parameter verification information into the second storage unit of the terminal; and the sending unit 703 is configured to externally send the unlocking code for storage, and a specific storage manner may adopt the abovementioned storage manner.

From the above analysis, it can further be seen that the first storage unit 701 and second storage unit 702 in the embodiment may be the same storage unit, and may also be different storage units; and the second storage unit may preferably be an OTP storage unit.

In the embodiment, the operation that the processing unit 705 obtains the network locking parameter verification information according to the unique identification information of the hardware of the terminal and the network locking parameter includes that:

a first digest value for the unique identification information of the hardware of the terminal and the network locking parameter is calculated;

the first digest value is encrypted using a private key in a preset asymmetric encryption key pair to obtain first network locking parameter verification information;

the operation further includes that:

a second digest value for the unique identification information of the hardware of the terminal and a public key in the asymmetric encryption key pair is calculated; and the second digest value is encrypted using the private key in the asymmetric encryption key pair to obtain second network locking parameter verification information.

In the embodiment, the unique identification information of the hardware of the terminal may be unique identification information, which may only be acquired through an internal program of the terminal, of the hardware, so that security of network locking is further improved; and for example, the unique identification information may be unique identification information of a baseband chip of the terminal.

In the embodiment, the receiving unit 704 is further configured to receive a first unlocking code input by a user; and the processing unit 705 is further configured to calculate a local unlocking code according to the network locking parameter stored in the terminal and the unique identification information, adopted for network locking, of the hardware of the terminal, perform comparison to determine whether the first unlocking code input by the user is consistent with the local unlocking code, determine that network unlocking succeeds if YES, otherwise determine current unlocking fails. After determining that unlocking succeeds, the processing unit 705 may update the unlocking parameter according to the methods shown in FIG. 5 to FIG. 6, and verify the unlocking parameter when the terminal is started; and when determining that current unlocking fails, the current number of unlocking failures may be updated to provide a determination basis for subsequent unlocking.

In the embodiment, before the receiving unit 704 receives the first unlocking code input by the user, the processing unit 705 may further perform integrity verification on the network locking parameter and the public key in the asymmetric encryption key pair adopted for a network locking process of the terminal in advance by virtue of the methods shown in FIG. 3 to FIG. 4, which will not be elaborated herein.

Embodiment 2

In order to better understand the technical solutions of the disclosure, the technical solutions of the disclosure will be further described below with reference to a network locking flow and network unlocking flow of a mobile terminal (which may not, of course, be limited to a mobile terminal, and may also be a non-mobile terminal).

Figure 8:
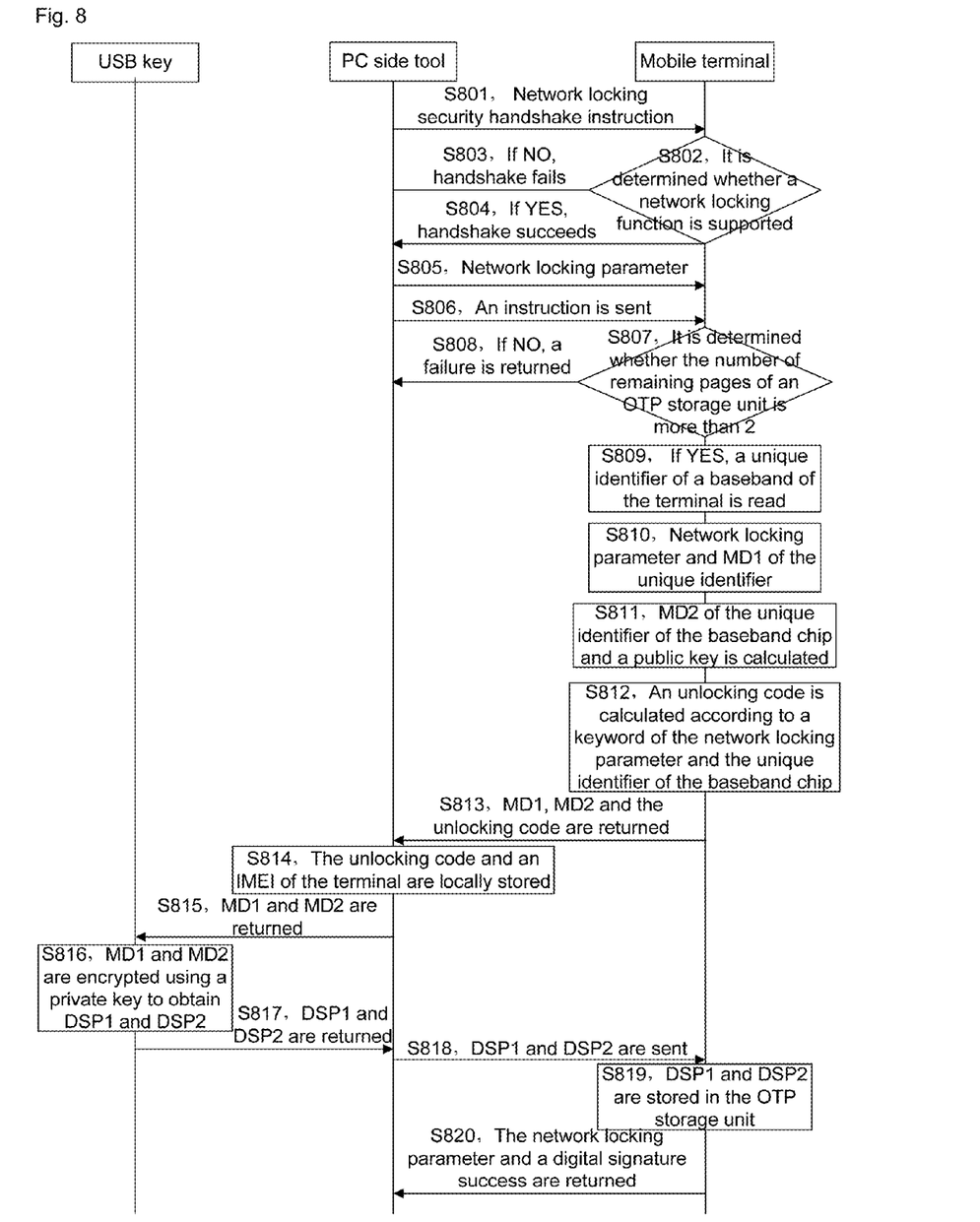
FIG. 8 is a flowchart of network locking of a terminal according to embodiment 2 of the disclosure.

Referring to FIG. 8, the network locking flow of the mobile terminal includes:

Step S801, a PC side tool sends a network locking security handshake instruction to the mobile terminal;

Step S802, the mobile terminal determines whether a network locking function is supported, wherein the mobile terminal specifically determines whether the network locking function is supported, Step S803 is executed if the mobile terminal does not support the network locking function, otherwise Step S804 is executed;

Step S803, a handshake failure is returned;

Step S804, a handshake success is returned;

Step S805, the PC side tool sends a network locking parameter PLMN to the mobile terminal, wherein the PC side tool specifically sends the network locking parameter PLMN to the mobile terminal, and then the mobile terminal writes it into a first storage unit such as an NVRAM;

Step S806, the PC side tool sends an instruction to the mobile terminal, wherein the instruction sent to the mobile terminal by the PC side tool is configured to request for network locking parameter verification information and public key parameter verification information, i.e. first network locking parameter verification information and second network locking parameter verification information respectively;

Step S807, the mobile terminal determines whether the number of remaining pages of an OTP storage unit is more than 2, wherein the mobile terminal specifically determines whether the number of the remaining pages of the OTP storage unit (i.e. a second storage unit) of a flash is more than 2, namely determines whether a storage space is sufficient, Step S808 is executed if the number of the remaining pages is less than 2, otherwise Step S809 is executed;

Step S808, a failure is returned;

Step S809, a unique identifier of a baseband chip of the terminal is read, wherein the terminal specifically reads the unique identifier, such as an HW key, of the baseband chip of the terminal through an internal upper-layer application program;

Step S810, the mobile terminal calculates a first digest value MD1 of the network locking parameter and the unique identifier, wherein the mobile terminal specifically calculates MD1 of the network locking parameter and the unique identifier, i.e. MD1 of the HW key;

Step S811, the mobile terminal calculates a second digest value MD2 of an unlocking public key and the unique identifier, wherein the mobile terminal specifically calculates MD2 of the network locking parameter and the unique identifier, i.e. MD2 of the HW key;

Step S812, the mobile terminal calculates an unlocking code according to a keyword of the network locking parameter and the unique identifier of the baseband chip, wherein the mobile terminal specifically calculates the unlocking code according to the keyword of the network locking parameter and the HW key;

Step S813, the mobile terminal returns MD1, MD2 and the unlocking code to the PC side tool;

Step S814, the PC side tool locally stores the unlocking code and an IMEI of the terminal, wherein the PC side tool stores the IMEI of the terminal in a local database as an index of the unlocking code;

Step S815, the PC side tool returns MD1 and MD2 to a USB key;

Step S816, the USB key encrypts MD1 and MD2 using a private key to obtain DSP1 and DSP2;

wherein the USB key performs digital signing on MD1 and MD2 using the RSA private key to generate the first network locking parameter verification information (DSP1) and the second network locking parameter verification information (DSP2);

Step S817, the USB key returns DSP1 and DSP2 to the PC side tool;

Step S818, the PC side tool sends DSP1 and DSP2 to the mobile terminal;

Step S819, DSP1 and DSP2 are stored in the OTP storage unit,

Wherein the mobile terminal writes DSP1 and DSP2 into the OTP storage unit of the flash respectively; and Step S820, the mobile terminal returns the network locking parameter and a network locking success.

Figure 9:
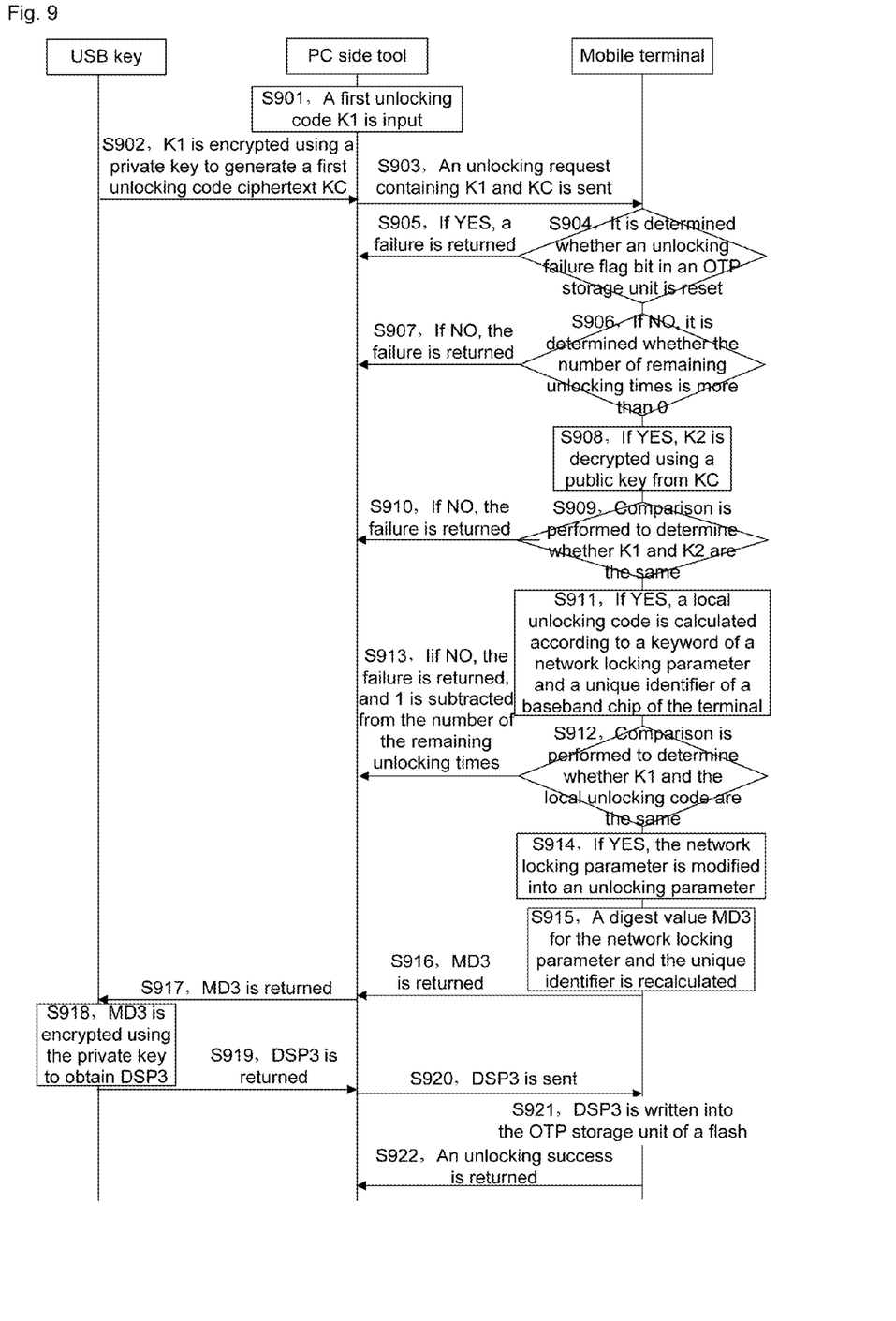
FIG. 9 is a flowchart of releasing network locking of a terminal according to embodiment 2 of the disclosure.

Integrity detection on the network locking parameter and the public key will not be elaborated herein, the technical solutions of the disclosure are further described herein directly with the unlocking flow of the mobile terminal as an example, and referring to FIG. 9, the flow includes:

Step S901, a user inputs a first unlocking code K1 into the PC side tool;

Step S902, the USB key encrypts the unlocking code K1 using the private key to generate a first unlocking code ciphertext KC;

Step S903, the PC side tool sends an unlocking request containing K1 and KC to the mobile terminal;

Step S904, whether an unlocking failure flag bit in the OTP storage unit is reset, wherein the mobile terminal specifically detects whether the unlocking failure flag bit in the OTP storage unit of the flash is reset, Step S905 is executed if YES, otherwise Step S906 is executed;

Step S905, an unlocking failure message is returned to the PC side tool;

Step S906, the mobile terminal determines whether the number of remaining unlocking times is more than 0, Step S907 is executed if NO, otherwise Step S908 is executed;

Step S907, a failure is returned, that is, if the number of the remaining unlocking times is not more than 0, the terminal returns the unlocking failure message to the PC side tool;

Step S908, K2 is decrypted from KC using the public key, wherein the terminal decrypts a first check unlocking code K2 from the ciphertext KC using the public key adopted for network locking;

Step S909, comparison is performed to determine whether K1 and K2 are the same, Step S910 is executed if NO, otherwise Step S911 is executed;

Step S910, the failure is returned, that is, the terminal returns the unlocking failure message to the PC side tool;

Step S911, a local unlocking code is calculated according to the keyword of the network locking parameter and the unique identifier of the baseband chip of the terminal, wherein the terminal calculates the local unlocking code according to the keyword of the network locking parameter and the unique identifier, such as the HW key, of the baseband chip of the terminal;

Step S912, comparison is performed to determine whether K1 and the local unlocking code are the same, Step S913 is executed if NO, otherwise Step S914 is executed;

Step S913, the failure is returned, and 1 is subtracted from the number of the remaining unlocking times, wherein the terminal returns the unlocking failure message to the PC side tool, simultaneously subtracts 1 from the number of the remaining unlocking times, and writes a result into the OTP storage unit of the flash;

Step S914, the terminal modifies the network locking parameter into an unlocking parameter;

Step S915, a third digest value MD3 of the network locking parameter and the unique identifier is recalculated, wherein the terminal recalculates the third digest value MD3 of the unlocking parameter and the unique identifier such as the HW key;

Step S916, the terminal returns MD3 to the PC side tool;

Step S917, the PC side tool returns MD3 to the USB key;

Step S918, MD3 is encrypted using the private key to obtain DSP3, wherein the USB key encrypts MD3 using the private key to generate the first network locking parameter verification information DSP3;

Step S919, the USB key returns DSP3 to the PC side tool;

Step S920, the PC side tool sends DSP3 to the mobile terminal;

Step S921, the terminal writes DSP3 into the OTP storage unit of the flash; and

Step S922, an unlocking success is returned, that is, the terminal returns an unlocking success message.

At this point, introduction about the specific implementation steps involved in the terminal hardware identifier-based security network locking and unlocking methods for a terminal have been finished. It can be seen that security of network locking of the terminal may be improved by the network locking method and corresponding network unlocking method provided by the embodiment of the disclosure.

The sending unit, receiving unit and processing unit in the terminal provided by the embodiment of the disclosure may all be implemented by a processor in the mobile terminal, and may, of course, also be implemented by a specific logic circuit; and in a specific implementation process, the processor may be a Central Processing Unit (CPU), a Micro Processing Unit (MPU), a Digital Signal Processor (DSP), a Field Programmable Gate Array (FPGA) or the like.

The network locking method for a terminal and/or the network unlocking method for a terminal in the embodiment of the disclosure may also be stored in a computer-readable storage medium if being implemented in form of software function module and sold or used as independent products. Based on such understanding, the technical solutions of the embodiment of the disclosure or the parts contributing to the prior art may be embodied in form of software product, and the computer software product is stored in a storage medium, and includes a plurality of instructions to enable a piece of computer equipment (which may be a PC, a server, network equipment or the like) to execute all or part of the methods of each embodiment of the disclosure. The storage medium includes: various media capable of storing program codes, such as a U disk, a mobile hard disk, a Read-Only Memory (ROM), a disk or a compact disc. Therefore, the embodiment of the disclosure is not limited to any specific hardware and software combination.

Correspondingly, the embodiment of the disclosure further provides a computer storage medium having stored therein a computer-executable instruction configured to execute a network locking method for a terminal and/or a network unlocking method for a terminal in the embodiment of the disclosure.

The above is only further detailed description made about the technical solutions of the disclosure with reference to specific implementation modes, and specific implementation of the disclosure may not be considered to be limited to the description. Those skilled in the art may further make a plurality of simple deductions or replacements without departing from the concept of the disclosure, and these deductions or replacements shall fall within the scope of protection of the disclosure.

INDUSTRIAL APPLICABILITY

In the embodiment of the disclosure, during network locking of the terminal, the network locking parameter is written into the first storage unit of the terminal, and the network locking parameter verification information and the unlocking code are obtained on the basis of the unique identification information of the hardware of the terminal and the network locking parameter; and when network unlocking of the terminal is performed, the unlocking code is obtained according to the network locking parameter stored in the terminal and the unique identification information of the hardware of the terminal; and comparison is performed to determine whether the unlocking code is consistent with the unlocking code input by the user, and when the two codes are consistent, it is determined that network unlocking is successfully performed. It is clear that the embodiment of the disclosure may implement unique binding of the network locking parameter of the terminal and the unique identification information of the hardware of the terminal, and network unlocking may be smoothly performed only according to the unique identification information of the hardware of the terminal, so that difficulty in illegal cracking of the unlocking code can be increased to a greater extent, and thus security of network locking of the terminal can be improved.

What is claimed is:

1. A network locking method for a terminal, comprising:
   writing a network locking parameter into a first storage unit of the terminal;
   obtaining network locking parameter verification information and an unlocking code according to unique identification information of hardware of the terminal and the network locking parameter; and
   storing the obtained network locking parameter verification information into a second storage unit of the terminal, and storing the unlocking code,
   wherein obtaining the network locking parameter verification information according to the unique identification information of the hardware of the terminal and the network locking parameter comprises: calculating a first digest value for the unique identification information of the hardware of the terminal and the network locking parameter, and encrypting the first digest value using a private key in a preset asymmetric encryption key pair to obtain first network locking parameter verification information; and
   wherein obtaining the network locking parameter verification information according to the unique identification information of the hardware of the terminal and the network locking parameter further comprises: calculating a second digest value for the unique identification information of the hardware of the terminal and a public key in the asymmetric encryption key pair, and encrypting the second digest value using the private key in the asymmetric encryption key pair to obtain second network locking parameter verification information.

2. The network locking method for a terminal according to claim 1, wherein the unique identification information of the hardware of the terminal is unique identification information, which can be acquired only through an internal program of the terminal, of the hardware.

3. The network locking method for a terminal according to claim 2, wherein the unique identification information of the hardware of the terminal is unique identification information of a baseband chip of the terminal.

4. A network unlocking method for a terminal, comprising:
   performing integrity check on a network locking parameter stored in a first storage unit of the terminal when the terminal is started;
   receiving a first unlocking code input by a user;
   calculating a local unlocking code of the terminal according to the network locking parameter stored in the terminal and unique identification information, adopted for network locking, of hardware of the terminal; and
   performing comparison to determine whether the first unlocking code is consistent with the local unlocking code, and if YES, determining that network unlocking succeeds,
   wherein performing integrity check on the network locking parameter stored in the first storage unit of the terminal comprises:
   reading first network locking parameter verification information stored during the network locking from a second storage unit of the terminal, performing decryption processing on the first network locking parameter verification information according to a public key in an asymmetric encryption key pair adopted for the network locking of the terminal to obtain a first check digest value, and acquiring a check network locking parameter from the first check digest value; and
   comparing the check network locking parameter with the network locking parameter stored in the first storage unit to determine whether the two parameters are consistent, and if YES, determining that the network locking parameter is complete.

5. The network unlocking method for a terminal according to claim 4, further comprising: before performing comparison to determine whether the first unlocking code is consistent with the local unlocking code,
   receiving the first unlocking code and a first unlocking code ciphertext, wherein the first unlocking code ciphertext is a ciphertext obtained by encrypting the first unlocking code input by the user using a private key in the asymmetric encryption key pair adopted for the network locking of the terminal;
   unlocking the first unlocking code ciphertext according to the public key in the asymmetric encryption key pair adopted for the network locking of the terminal to obtain a first check unlocking code; and
   performing comparison to determine whether the first unlocking code is consistent with the first check unlocking code, and if YES, performing comparison to determine whether the first unlocking code is consistent with the local unlocking code.

6. The network unlocking method for a terminal according to claim 5, further comprising: before receiving the first unlocking code input by the user and when the terminal is started,
   performing integrity check on the public key in the asymmetric encryption key pair adopted for the network locking of the terminal.

7. The network unlocking method for a terminal according to claim 6,
   wherein performing integrity check on the public key in the asymmetric encryption key pair adopted for the network locking of the terminal comprises:
   reading second network locking parameter verification information stored during the network locking from the second storage unit of the terminal, performing decryption processing on the second network locking parameter verification information according to the public key in the asymmetric encryption key pair adopted for the network locking of the terminal to obtain a second check digest value, and acquiring a check public key from the second check digest value; and
   comparing the check public key with the public key stored in the second storage unit during the network locking to determine whether the two keys are consistent, and if YES, determining that the public key is complete.

8. The network unlocking method for a terminal according to claim 4, further comprising:
   after network unlocking of the terminal is successfully performed,
   updating the network locking parameter stored in the first storage unit of the terminal into an unlocking parameter;
   calculating a third digest value for the unique identification information of the hardware of the terminal and the unlocking parameter; and
   encrypting the third digest value using a private key in the asymmetric encryption key pair adopted for the network locking to obtain third network locking parameter verification information, and storing the third network locking parameter verification information into the second storage unit of the terminal.

9. The network unlocking method for a terminal according to claim 8, further comprising:

when the terminal is started after successful unlocking, reading the third network locking parameter verification information from the second storage unit of the terminal, performing decryption processing on the third network locking parameter verification information according to the public key in the asymmetric encryption key pair adopted for the network locking of the terminal to obtain a third check digest value, and acquiring a check unlocking parameter from the third check digest value; and comparing the check unlocking parameter with the unlocking parameter stored in the first storage unit to determine whether the two parameters are consistent, and if YES, determining that the unlocking parameter is complete.

10. A terminal, comprising:

a first storage unit, a second storage unit, a sending unit, a receiving unit and a processing unit, wherein the receiving unit, comprising a receiver, is configured to receive a network locking parameter and store the network locking parameter in the first storage unit;

the processing unit, comprising a processor, is configured to obtain network locking parameter verification information and an unlocking code according to unique identification information of hardware of the terminal and the network locking parameter, and store the obtained network locking parameter verification information into the second storage unit of the terminal, wherein in order to obtain the network locking parameter verification information according to the unique identification information of the hardware of the terminal and the network locking parameter, the processing unit is configured to: calculate a first digest value for the unique identification information of the hardware of the terminal and the network locking parameter, and encrypt the first digest value using a private key in a preset asymmetric encryption key pair to obtain first network locking parameter verification information, and wherein in order to obtain the network locking parameter verification information according to the unique identification information of the hardware of the terminal and the network locking parameter, the processing unit is further configured to: calculate a second digest value for the unique identification information of the hardware of the terminal and a public key in the asymmetric encryption key pair, and encrypt the second digest value using the private key in the asymmetric encryption key pair to obtain second network locking parameter verification information; and the sending unit, comprising a transmitter, is configured to send out the unlocking code for storage.

11. The terminal according to claim 10, wherein the second storage unit is a One Time Programmable (OTP) storage unit.

12. The terminal according to claim 10, wherein the unique identification information of the hardware of the terminal is unique identification information, which can be acquired only through an internal program of the terminal, of the hardware.

13. The terminal according to claim 10, wherein the receiving unit is further configured to receive a first unlocking code input by a user; and the processing unit is further configured to calculate a local unlocking code according to the network locking parameter stored in the terminal and the unique identification information, adopted for network locking, of the hardware of the terminal, perform comparison to determine whether the first unlocking code is consistent with the local unlocking code, and if YES, determine that network unlocking succeeds.

14. A non-transitory computer storage medium having stored therein computer-executable instructions configured to execute a network locking method for a terminal, the network locking method for a terminal comprising:

writing a network locking parameter into a first storage unit of the terminal;

obtaining network locking parameter verification information and an unlocking code according to unique identification information of hardware of the terminal and the network locking parameter; and storing the obtained first network locking parameter verification information into a second storage unit of the terminal, and storing the unlocking code, wherein obtaining the network locking parameter verification information according to the unique identification information of the hardware of the terminal and the network locking parameter comprises: calculating a first digest value for the unique identification information of the hardware of the terminal and the network locking parameter, and encrypting the first digest value using a private key in a preset asymmetric encryption key pair to obtain first network locking parameter verification information; and the computer-executable instructions being configured to execute a network unlocking method for a terminal, the network unlocking method for a terminal comprising:

performing integrity check on the network locking parameter stored in the first storage unit of the terminal when the terminal is started;

receiving a first unlocking code input by a user;

calculating a local unlocking code of the terminal according to the network locking parameter stored in the terminal and unique identification information, adopted for network locking, of hardware of the terminal; and performing comparison to determine whether the first unlocking code is consistent with the local unlocking code, and if YES, determining that network unlocking succeeds, wherein performing integrity check on the network locking parameter stored in the first storage unit of the terminal comprises:

reading first network locking parameter verification information stored during the network locking from a second storage unit of the terminal, performing decryption processing on the first network locking parameter verification information according to a public key in an asymmetric encryption key pair adopted for the network locking of the terminal to obtain a first check digest value, and acquiring a check network locking parameter from the first check digest value; and comparing the check network locking parameter with the network locking parameter stored in the first storage unit to determine whether the two parameters are consistent, and if YES, determining that the network locking parameter is complete.

* * * * *